(12) United States Patent
Oh

(10) Patent No.: US 9,854,884 B2
(45) Date of Patent: Jan. 2, 2018

(54) LUGGAGE HAVING AN INTEGRATED STRUCTURE AND METHOD OF MANUFACTURING THE SAME

(71) Applicant: Scott Oh, Rancho Cucamonga, CA (US)

(72) Inventor: Scott Oh, Rancho Cucamonga, CA (US)

( * ) Notice: Subject to any disclaimer, the term of this patent is extended or adjusted under 35 U.S.C. 154(b) by 830 days.

(21) Appl. No.: 14/188,564

(22) Filed: Feb. 24, 2014

(65) Prior Publication Data
US 2017/0000228 A1    Jan. 5, 2017

(51) Int. Cl.
| | |
|---|---|
| *A45C 5/03* | (2006.01) |
| *B29C 45/44* | (2006.01) |
| *A45C 5/02* | (2006.01) |
| *B29C 45/33* | (2006.01) |
| *A45C 5/14* | (2006.01) |
| *B29K 23/00* | (2006.01) |
| *B29L 31/00* | (2006.01) |

(52) U.S. Cl.
CPC .................. *A45C 5/03* (2013.01); *A45C 5/02* (2013.01); *B29C 45/33* (2013.01); *B29C 45/4421* (2013.01); *A45C 5/14* (2013.01); *A45C 2005/037* (2013.01); *B29K 2023/12* (2013.01); *B29L 2031/7418* (2013.01)

(58) Field of Classification Search
CPC .... A45C 5/03; A45C 5/02; A45C 5/14; A45C 2005/037; B29C 45/4421; B29C 45/33; B29C 2045/445; B29C 33/44; B29C 33/48; B29C 45/445; B29L 2031/7418; B29K 2023/12
See application file for complete search history.

(56) References Cited

U.S. PATENT DOCUMENTS

| | | | | |
|---|---|---|---|---|
| 2,687,157 A | * | 8/1954 | Cowan .................... | B29C 33/30 16/385 |
| 3,317,955 A | * | 5/1967 | Confer ................ | B29C 49/0073 264/524 |
| 3,595,433 A | * | 7/1971 | Jones ...................... | B42F 17/08 206/737 |
| 4,049,231 A | * | 9/1977 | Lutz ..................... | A45C 13/005 249/119 |
| 5,336,460 A | * | 8/1994 | Hettinga ........... | B29C 45/14336 264/251 |
| 5,447,673 A | * | 9/1995 | Belvederi ........... | B29C 45/0081 206/256 |

* cited by examiner

*Primary Examiner* — Jun Yoo
(74) *Attorney, Agent, or Firm* — Lucem, PC; Heedong Chae

(57) ABSTRACT

The present invention relates to a luggage, having an integrated structure. The luggage includes a one-piece shell, which is constructed from a single molding to form a continuous structure and has at least a top wall and two opposing side walls. The top wall has two sloping curved corners which are sloped and curved toward the cover of the luggage and the respectively abutting side wall. The present also invention provides a method of manufacturing the luggage. The method includes the steps of assembling a family mold to form a mold cavity, injecting mold material into the mold cavity to make the one-piece shell for the luggage, and removing the family mold. The family mold includes an inner mold tool and an outer mold tool, and the step of removing the family mold includes the steps of removing the outer mold tool first, and then, removing the inner mold tool.

8 Claims, 9 Drawing Sheets

LUGGAGE HAVING AN INTEGRATED STRUCTURE AND METHOD OF MANUFACTURING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to a luggage having an integrated structure and a method of manufacturing the same and, more particularly, to a luggage having a one-piece shell with sloping curved corners on its top wall. The method of manufacturing the luggage involves a family mold having a plurality of parts and a sequence to remove the mold parts.

BACKGROUND OF THE INVENTION

There are two kinds of luggage: hard-side luggage cases and soft-side luggage cases. Hard-side luggage cases are made by formable, hard materials, such as acrylonitrile butadiene styrene (ABS) or other materials having a generally uniform thickness, to create a protective cover for the contents of the case, thereby providing excellent stiffness and support. The advantage of the hard-side luggage cases is that they can well protect the contents of the case because they are durable and not subject to deformity. However, hard-side luggage cases have the downsides that they are typically heavier than soft-side luggage cases, that their packing space does not expand, and that external pockets are difficult to form on the outer surface of the hard-sided luggage.

On the other hand, soft-sided luggage cases have the advantages that hard-sided luggage cases do not have. Soft-sided luggage cases are relatively light-weight and their packing space can expand because they are made by using fabric layers to cover an internal frame structure. Pockets can be formed on the outer surface of the soft-sided luggage cases. However, soft-sided luggage cases do not provide secure protection of the contents therein and contents may be damaged.

To overcome the downsides of the hard-sided and soft-sided luggage cases, hybrid luggage cases have been introduced and developed by combining hard-sided and soft-sided luggage structures. Hybrid luggage cases typically have hard-sided portion and soft-sided portion which are attached to each other by sewing or other type of mechanical fastening. Hybrid luggage cases can provide a secure protection of the contents and the packing space can expand toward the direction of the soft-sided portion.

However, hard-sided portion of the hybrid luggage cases does not typically have sloping curved edges because in manufacturing them by injection molding, mold cannot be removed if there are sloping curved corners. If the hybrid luggage cases have sloping curved corners, contents can be more securely contained in the case as they do not fall out.

Therefore, to solve the above problems, a need for a luggage having an integrated structure with sloping curved corners and its manufacturing method has been present for a long time considering the expansive demands in the everyday life. This invention is directed to solve these problems and satisfy the long-felt need.

SUMMARY OF THE INVENTION

The present invention contrives to solve the disadvantages of the prior art. The present invention provides an easy-to-use shoelace retaining device having a simple structure.

The object of the invention is to provide a luggage, having an integrated structure. The luggage includes a one-piece shell and a cover, and the one-piece shell, constructed from a single molding to form a continuous structure, has a base wall, a top wall, two opposing side walls, and a bottom wall. The top wall has two sloping curved corners which are sloped and curved toward the direction of the cover and toward the respectively abutting side wall.

Another object of the invention is to provide a luggage, having an integrated structure. The luggage includes a one-piece shell which is constructed from a single molding to form a continuous structure and has a base wall, a top wall, two opposing side walls, and a bottom wall. The top wall has two sloping curved corners which are sloped and curved toward the direction of the cover and toward the respectively abutting side wall. The luggage further includes a handle and a plurality of wheels.

Still another object of the invention is to provide a method of manufacturing the luggage of the present invention. The method includes the steps of assembling a family mold to form a mold cavity, injecting mold material into the mold cavity to make the one-piece shell for the luggage, and removing the family mold. The family mold includes an inner mold tool and an outer mold tool, and the step of removing the family mold includes the steps of removing the outer mold tool first, and then, removing the inner mold tool.

The advantages of the present invention are: (1) the luggage of the present invention includes a one-piece shell, having two sloping curved corners, which could not be manufactured by conventional molding methods; (2) the one-piece shell provides a hard, rigid and spacious room to contain and protect a number of items therein; (3) the sloping curved corners of the luggage help securely hold items in the luggage; and (4) the manufacturing method of the luggage utilizes a family mold to mold the one-piece shell which could not be manufactured by conventional methods.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
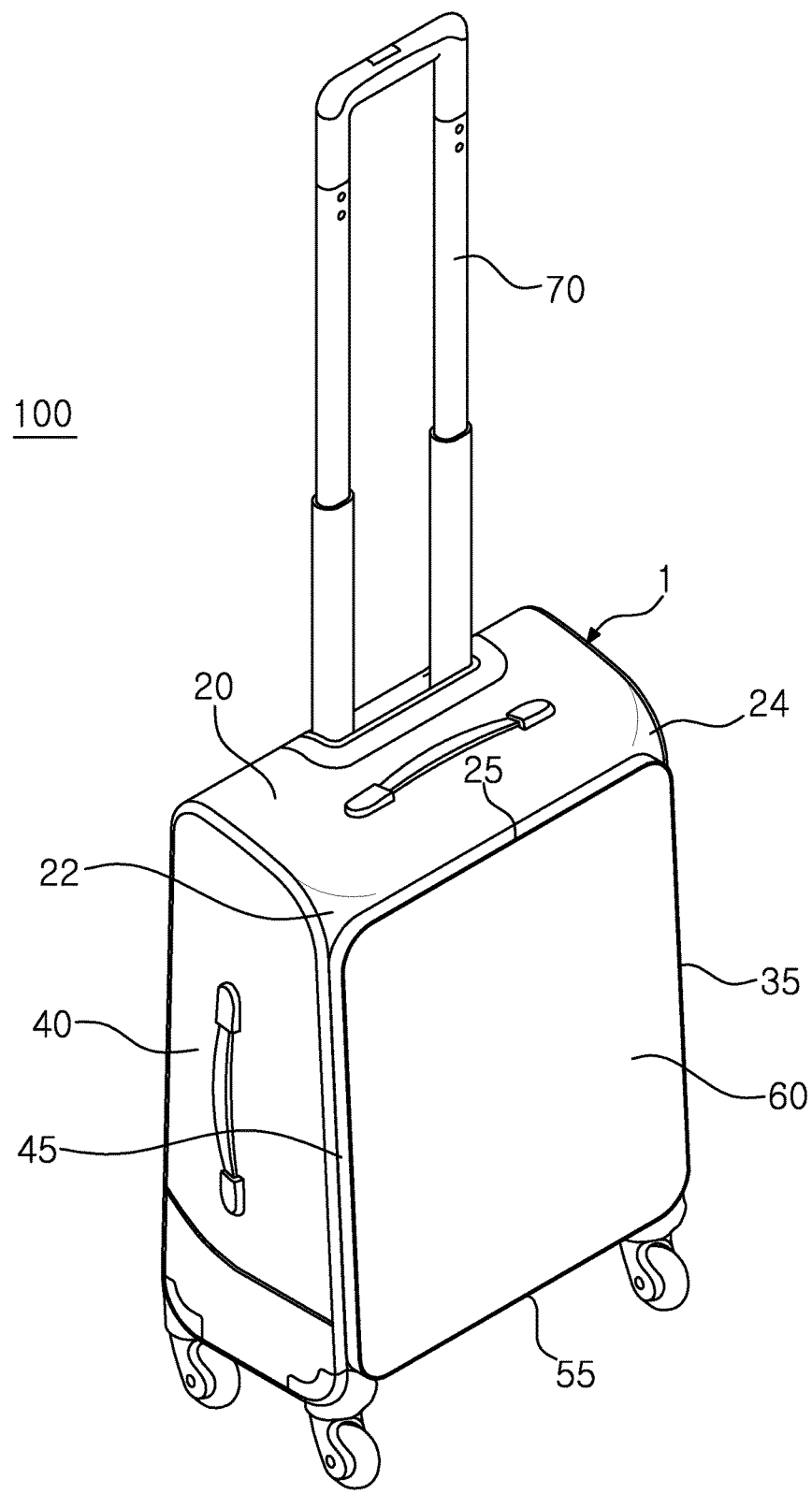
FIG. 1 shows a perspective view of a luggage having an integrated structure according to the present invention.
Figure 2:
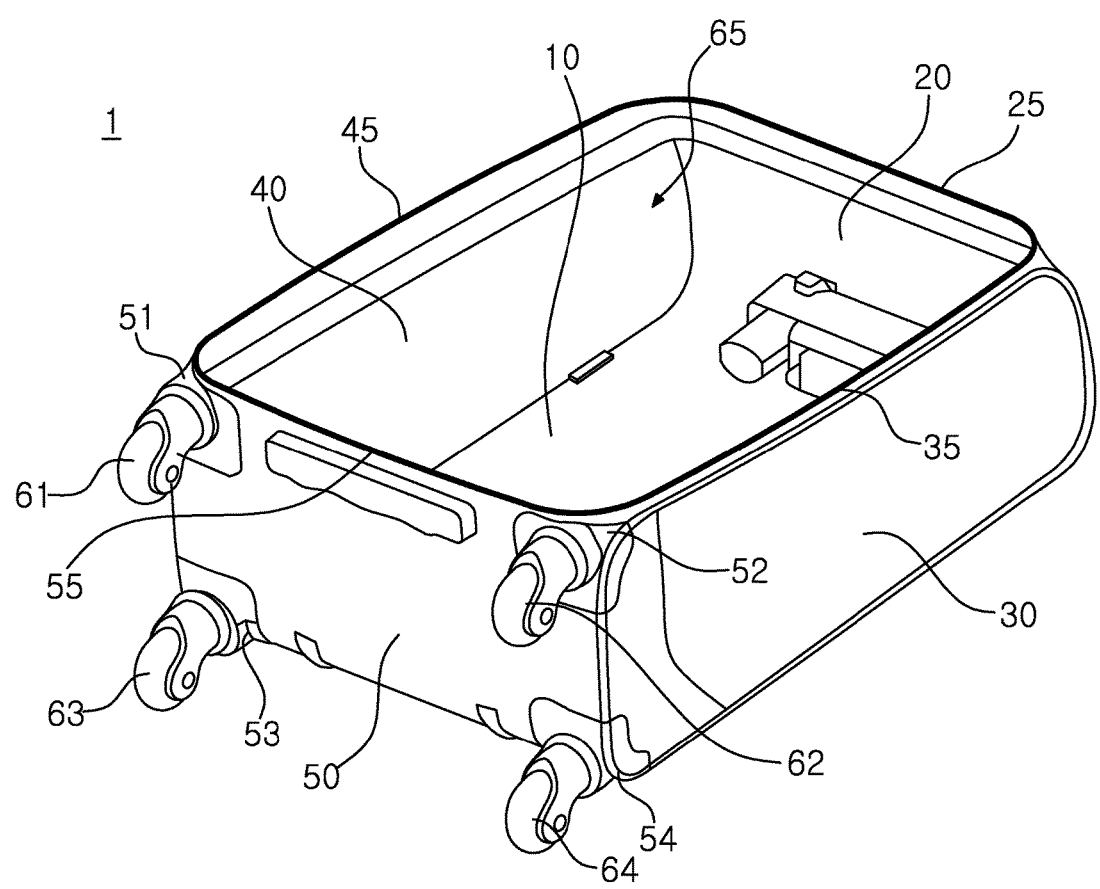
FIG. 2 shows a perspective view of the one-piece shell of the present invention with the rotating wheels installed.
Figure 3:
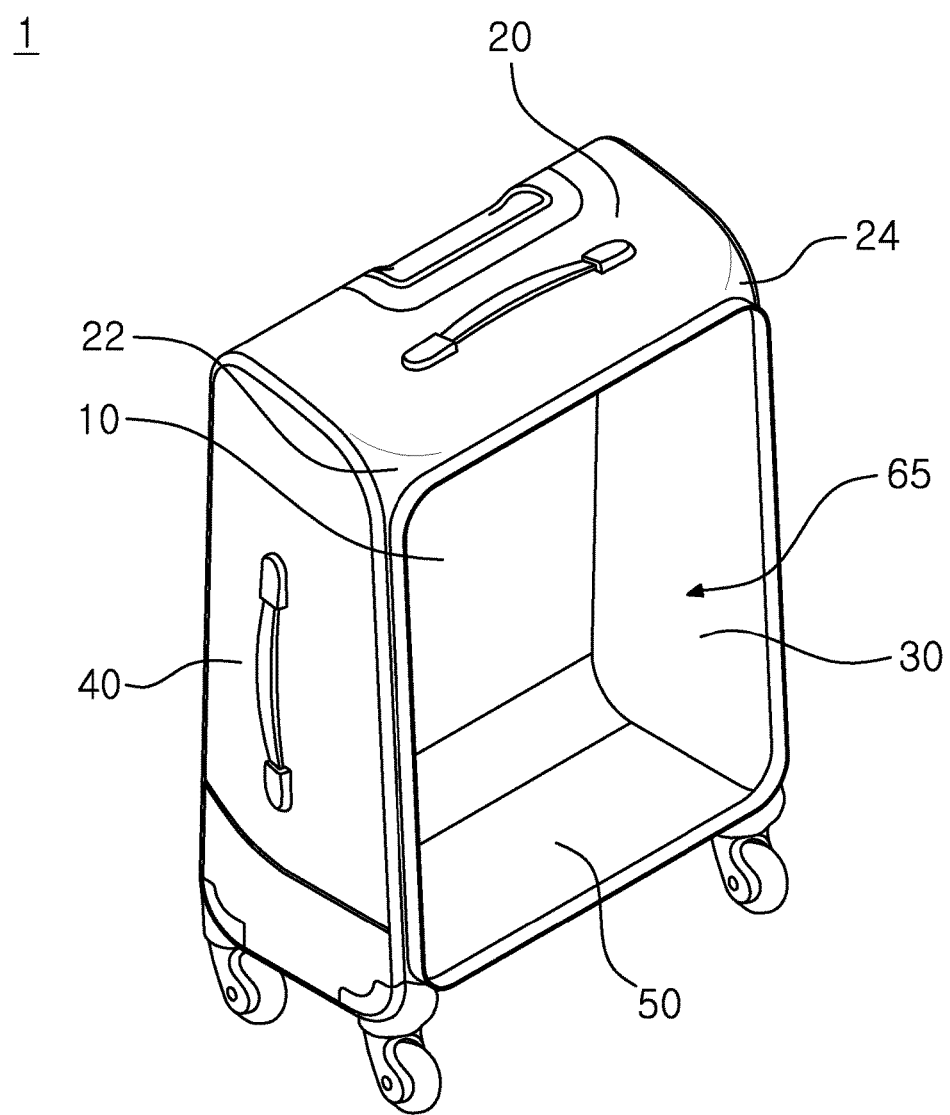
FIG. 3 shows another perspective view of the one-piece shell of the present invention with the rotating wheels installed.
Figure 4:
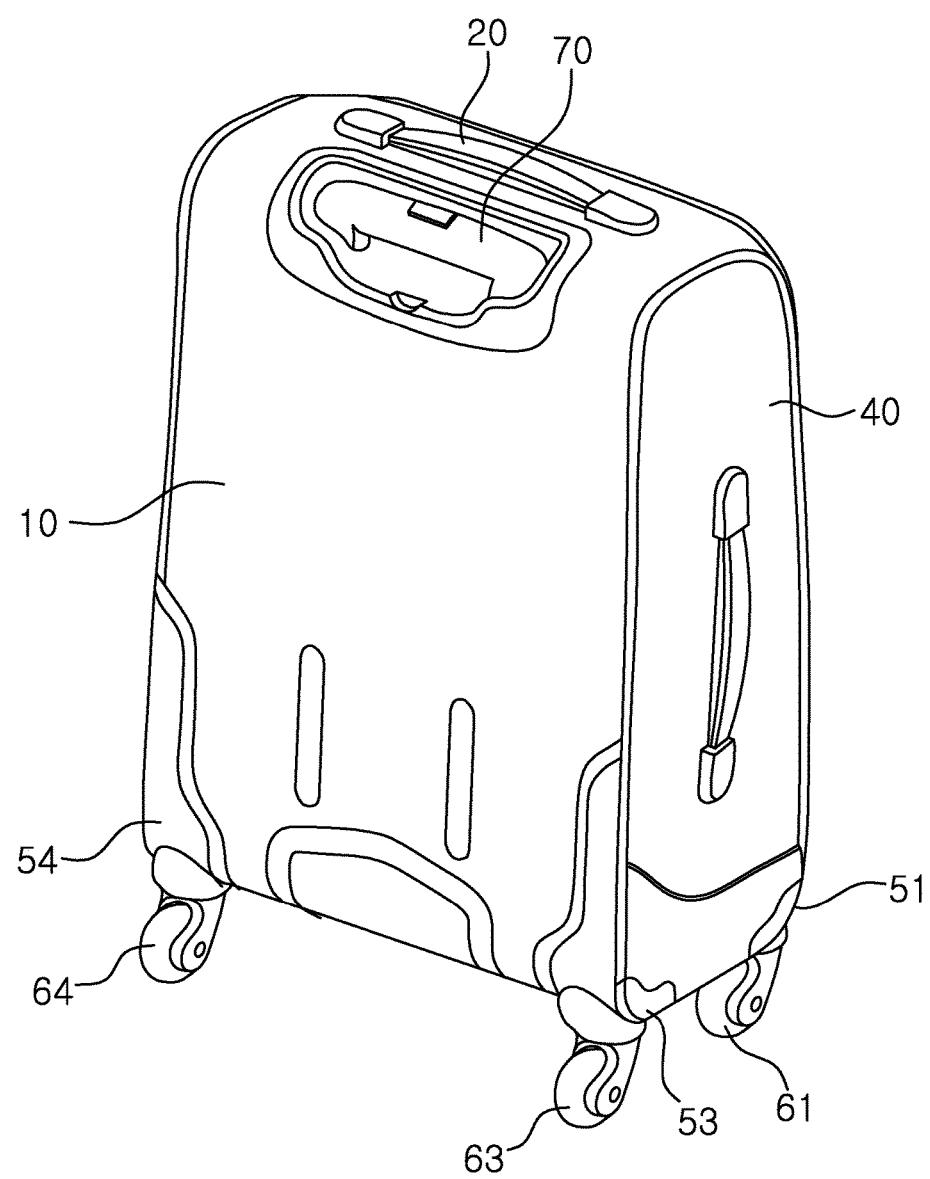
FIG. 4 shows still another perspective view of the one-piece shell of the present invention with the rotating wheels and the retractable handle installed.

FIG. 1 shows a perspective view of the luggage 100 of the present invention and FIGS. 2 and 3 show perspective views of the one-piece shell 1 of the luggage. FIG. 4 shows another perspective view of the one-piece shell 1 with the handle 70 and wheels 61, 62, 63, 64 installed.

The luggage 100 of the present invention, having an integrated structure, includes a one-piece shell 1 and a cover 60. The one-piece shell 1, which is constructed from a single molding to form a continuous structure, has a base wall 10, a top wall 20, two opposing side walls 30, 40, and a bottom wall 50. The cover 60 covers a front opening 65 of the one-piece shell 1.

The top wall 20 has a sloping curved corner 22, 24 which is sloped and curved toward the direction of the cover 60. Additionally, the sloping curved corner 22, 24 of the top wall 20 may be sloped and curved toward the abutting side wall 30, 40 as shown in FIGS. 1 and 3. The top wall 20 may include two sloping curved corners 22, 24 which are sloped and curved toward the cover 60 and toward the respectively abutting side wall 30, 40.

The luggage 100 may further include a handle 70 and the one-piece shell 1 may have a handle hole on the top wall 20 where the top wall 20 abuts the base wall 10. The handle 70 is installed and formed on the handle hole and the handle 70 may be retractable and telescoping.

The one-piece shell 1 has a plurality of wheel holes on the bottom wall 50 abutting the side wall 30, 40 or the base wall 10 and the luggage 100 further includes a plurality of wheels 61, 62, 63, 64 formed on the wheel holes. Preferably, there may be either two wheels or four wheels.

The wheels 61, 62 abutting the cover 60 may have sloping curved corners 51, 52 which are sloped and curved toward the cover 60 and the respectively abutting side wall 40, 30. Furthermore, the wheels 63, 64 abutting the base wall 10 may also have sloping curved corners 53, 54 which are sloped and curved toward the base 10 and the respectively abutting side wall 40, 30.

The one-piece shell 1 is made of plastic, and preferably, made of polypropylene. Unlike conventional shells, the one-piece shell 1 of the present invention has an integrated continuous structure with a lengthy depth and thus, materials having higher melt flow rate are suitable for molding the one-piece shell 1. Polypropylene has a high enough melt flow rate for the one-piece shell 1 whereas polycarbonate or acrylonitrile butadiene styrene (ABS) generally does not have such melt flow rate suitable for molding the one-piece shell 1.

The cover 60 is preferably made of fabric and may further comprise a pocket or pockets. The handle 70 is installed and formed on the handle hole of the one-piece shell 1 and a retractable name tag may be formed on the hole of the one-piece shell 1. The name tag may be retractable upwardly or horizontally.

Figure 5:
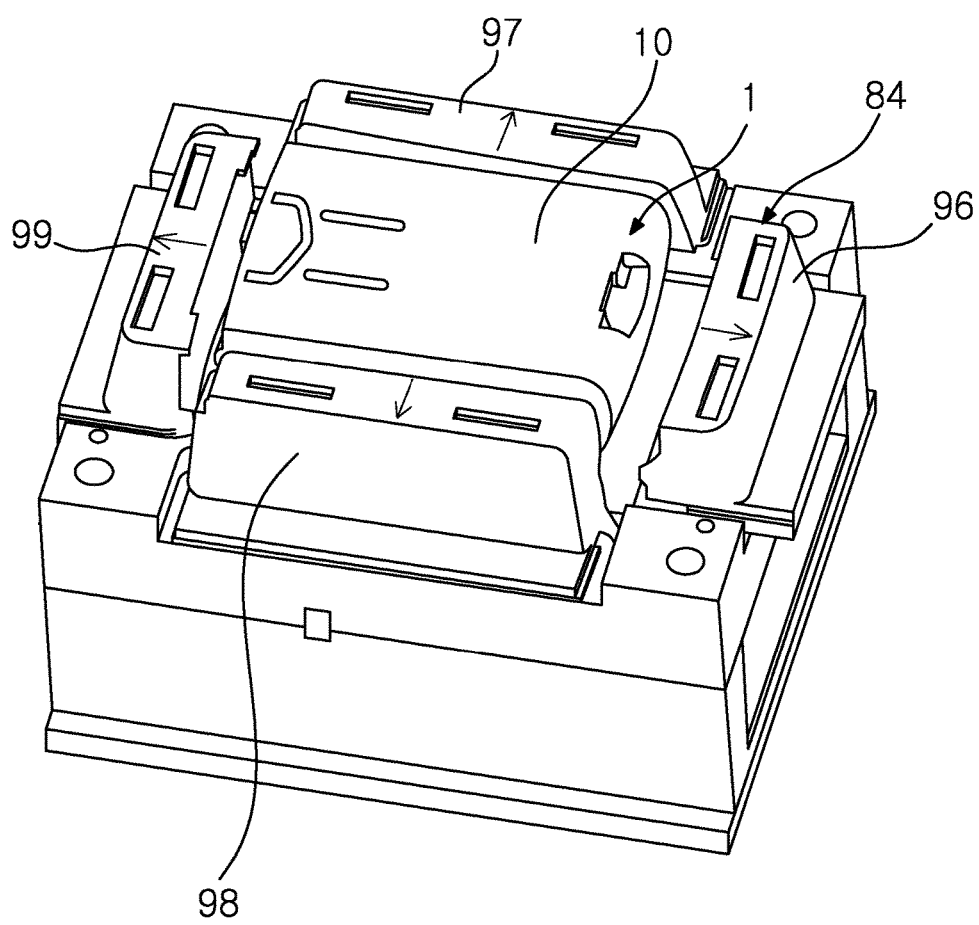
FIG. 5 shows a perspective view of the family mold system to manufacture the one-piece shell according to the present invention.
Figure 6:
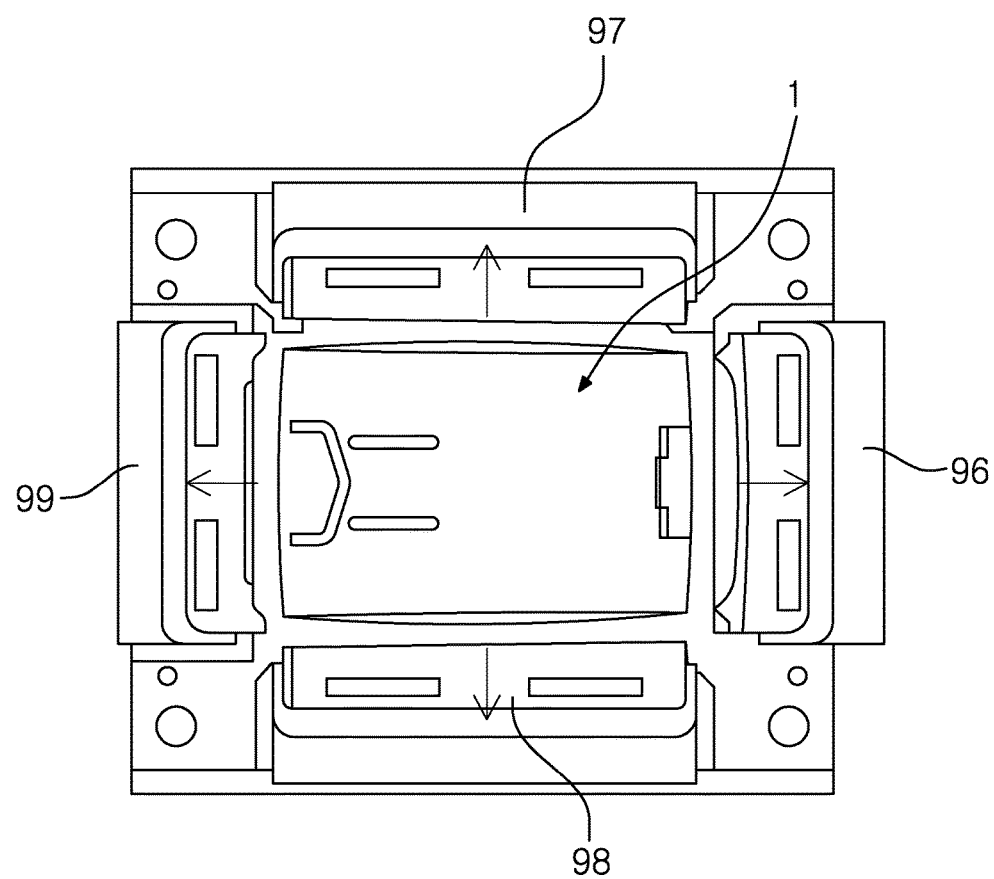
FIG. 6 shows a plan view of the family mold system to manufacture the one-piece shell according to the present invention.

FIGS. 5 and 6 respectively show perspective and plan views of the family mold 80 to manufacture the one-piece shell 1 according to the present invention.

The method of manufacturing a luggage 100 having an integrated structure includes the steps of assembling a family mold 80 to form a mold cavity, injecting mold material into the mold cavity to make a one-piece shell 1 for the luggage, and removing the family mold 80. The family mold 80 includes an inner mold tool 82 and an outer mold tool 92, and the step of removing the family mold 80 includes the steps of removing the outer mold tool 92 first, and then, removing the inner mold tool 82.

The one-piece shell 1 includes a base wall 10, a top wall 20, two opposing side walls 30, 40, and a bottom wall 50, and the top wall 20 includes sloping curved corners 22, 24 which are sloped and curved toward a front opening 65 of the one-piece shell 1. As shown in FIG. 7(b), the top mold inner-part 86 is configured to cover the top wall 20, the sloping curved corners 22, 24, an upper part of the opposing side walls 30, 40 and an upper part of the base wall 10.

The outer mold tool 92 comprises a top mold outer-part 96, opposing side mold outer-parts 97, 98, a bottom mold outer-part 99, and a base mold outer-part 95, and the inner mold tool 82 comprises a top mold inner-part 86, opposing side mold inner-parts 87, 88, a bottom mold inner-part 89, and a base mold inner-part 85. The top mold inner-part 86 is removed after the opposing side mold inner-parts 87, 88 and the base mold inner-part 85 are removed. FIG. 7(b) shows the top mold inner-part 86, and the top mold inner-part 86 cannot be removed unless the opposing side mold inner-parts 87, 88 and the base mold inner-part 85 are removed.

FIG. 6 does not show the base mold inner-part 85 and the base mold outer-part 95, but they are molds to form the base wall 10.

Figure 7A:
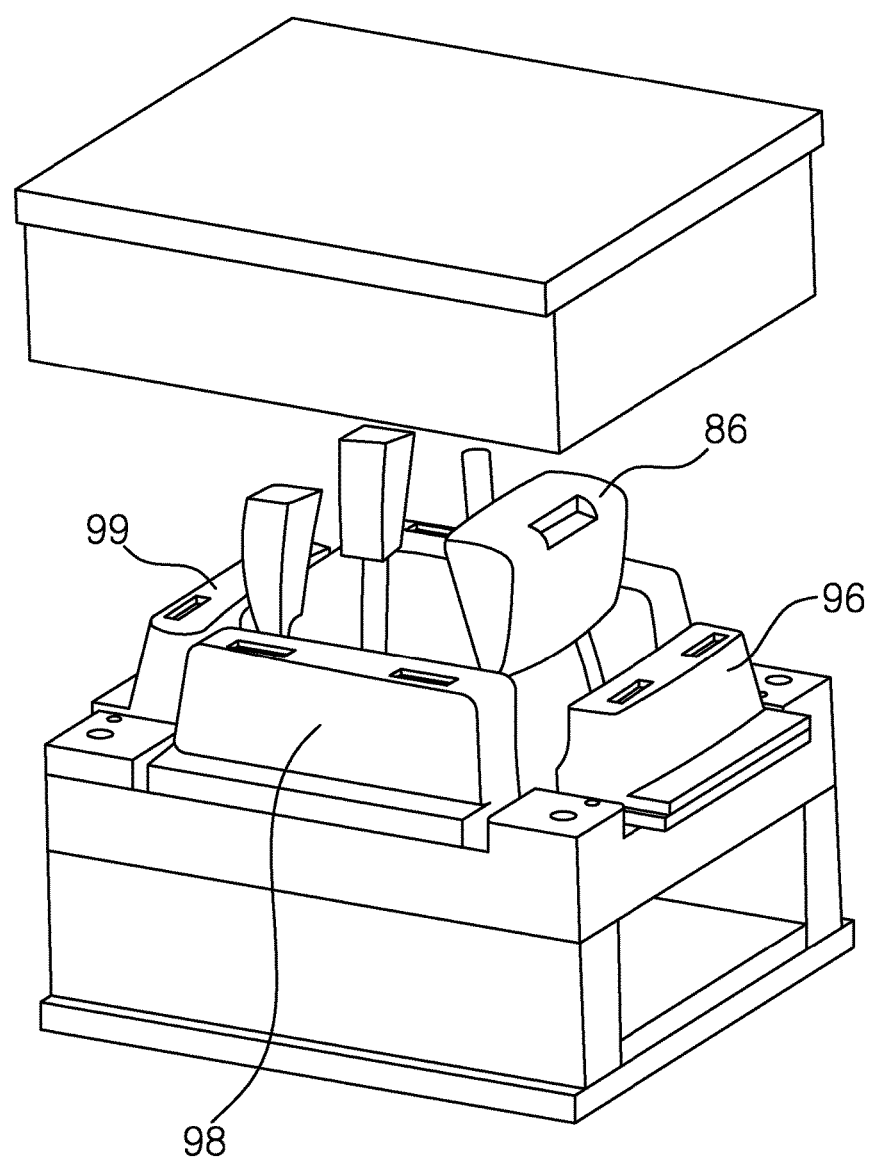
FIG. 7(a) shows a perspective view of the family mold system according to the present invention.
Figure 7B:
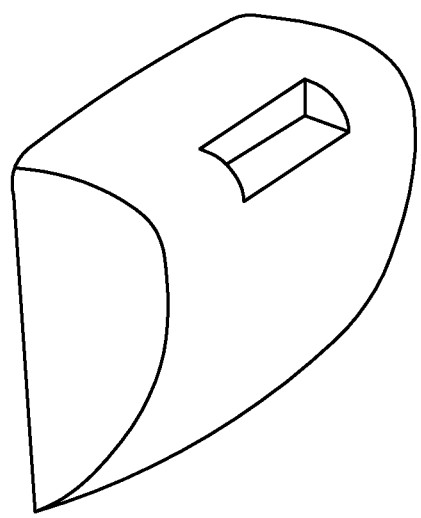
FIG. 7(b) shows a perspective view of the top mold inner part of the present invention.
Figure 8:
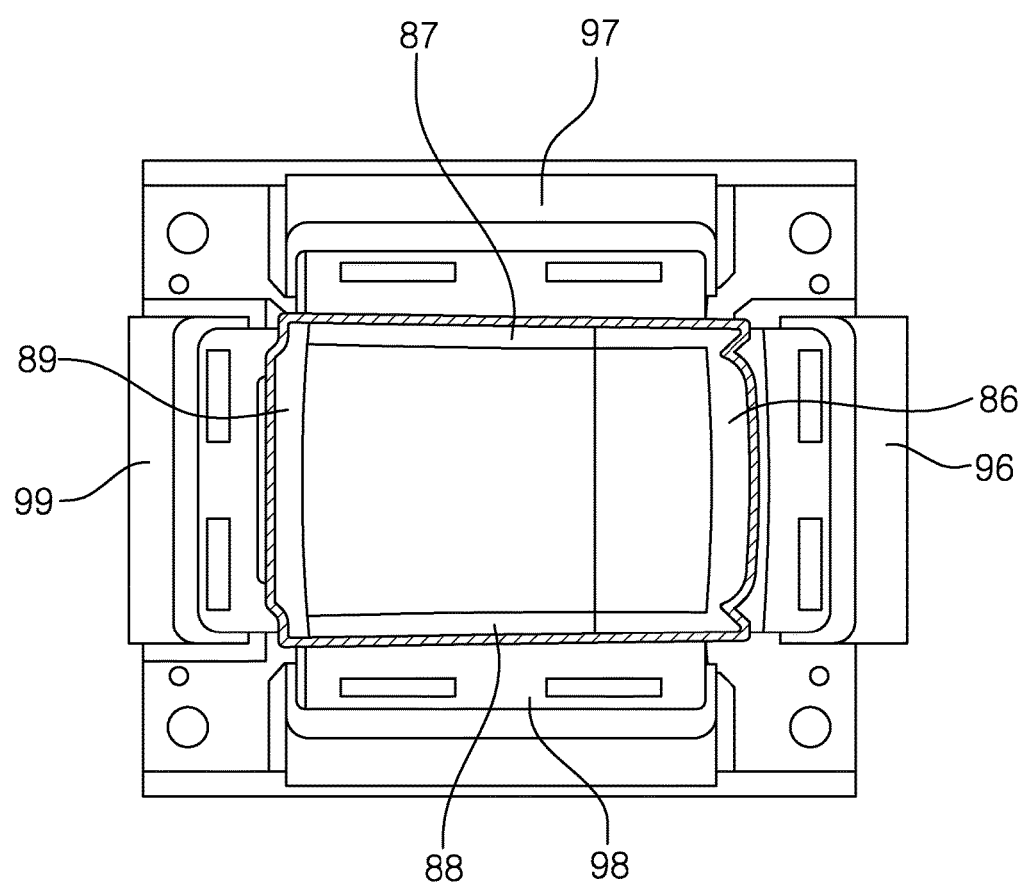
FIG. 8 shows a cross-sectional view of the family mold system illustrating the inner mold tool and the outer mold tool according to the present invention.

FIG. 7(a) shows a perspective view of the family mold 80 and FIG. 8 shows a cross-sectional view of the family mold system 80 illustrating the inner mold tool 82 and the outer mold tool 92.

The outer mold tool 92 can easily be removed without any interference, but removing the inner mold tool 82 may not be possible unless the dimensions of the inner mold tool 82 do not fit within the dimensions of the front opening 65. To help easy removal of the inner mold tool 82, the top mold inner-part 86 is configured to cover the top wall 20, the sloping curved corners 22, 24, an upper part of the opposing side walls 30, 40 and an upper part of the base wall 10. In addition, the length of the opposing side mold inner-parts 87, 88 is smaller than the side length 35, 45 of the front opening 65 so that the side mold inner-parts 87, 88 can be removed through the front opening 65 of the one-piece shell 1. Moreover, the length of the base wall inner-part 85 is smaller than the side length 35, 45 of the front opening 65 so that the base wall inner-part 85 can be removed through the front opening 65.

FIG. 8 shows a cross-sectional view of the inner mold tool 82 and the outer mold tool 92 except the base mold inner-part 85 and the base mold outer-part 95 to form the base wall 10 and FIG. 7(b) shows the configuration of the top mold inner-part 86. However, FIG. 8 is only one example of the family mold 80. The bottom mold inner-part 89 may additionally cover lower part of the opposing side walls 30, 40 and/or lower part of the base wall 10. Alternatively, the side mold inner-parts 87, 88 may additionally cover some part of the bottom wall 50 and/or some part of the base wall 10. Furthermore, there may be additional mold parts to cover corners between walls of the one-piece shell 1.

The mold material may be plastic, and preferably, polypropylene.

The method may further include the step of installing a retractable handle 70 to the one-piece shell 1 and the step of installing a plurality of wheels 61, 62, 63, 64 to the one-piece shell 1. In addition, the method may further include the step of attaching a cover 60 to cover the front opening 65.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A method of manufacturing a luggage having an integrated structure comprising the steps of:
    assembling a family mold to form a mold cavity, wherein the family mold comprises an inner mold tool and an outer mold tool, wherein the outer mold tool comprises a top mold outer-part, opposing side mold outer-parts, a bottom mold outer-part, and a base mold outer-part and wherein the inner mold tool comprises a top mold inner-part, opposing side mold inner-parts, a bottom mold inner-part, and a base mold inner-part;
    injecting mold material into the mold cavity to make a one-piece shell for the luggage;
    removing the outer mold tool; and
    removing the inner mold tool wherein the top mold inner-part is removed after the opposing side mold inner-parts and the base mold inner-part are removed,
    wherein the one-piece shell comprises a base wall, a top wall, two opposing side walls and a bottom wall,
    wherein the top wall includes a sloping curved corner which is sloped and curved toward a front opening of the one-piece shell, and
    wherein the top mold inner-part is to cover the top wall, the sloping curved corner, an upper part of the opposing side walls and an upper part of the base wall.

2. The method of claim 1, wherein a length of the opposing side mold inner-parts is smaller than a length of the front opening.

3. The method of claim 1, wherein a length of the base wall inner-part is smaller than a length of the front opening.

4. The method of claim 1, wherein the mold material is plastic.

5. The method of claim 1, wherein the mold material is polypropylene.

6. The method of claim 1, further comprising the step of installing a retractable handle to the one-piece shell.

7. The method of claim 1, further comprising the step of installing a plurality of wheels to the one-piece shell.

8. The method of claim 1, further comprising the step of attaching a cover to cover the front opening.

* * * * *